E. E. NOVOTNY.
METHOD OF AND APPARATUS FOR MOLDING PLASTIC ARTICLES.
APPLICATION FILED OCT. 23, 1919.
1,377,517.
Patented May 10, 1921.
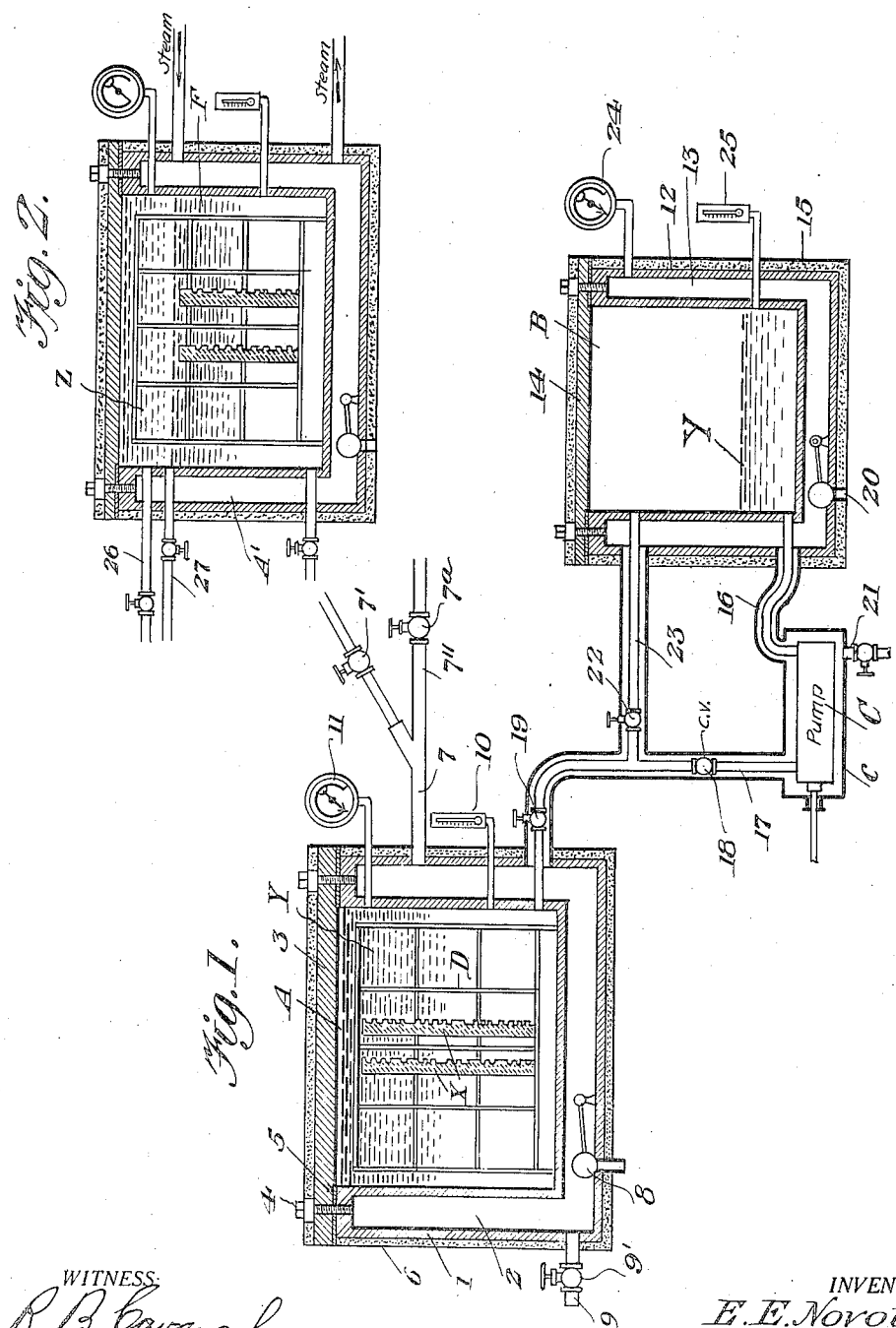
WITNESS:
R. B. Cavanagh
Arthur D. Bright
INVENTOR.
E. E. Novotny
BY Meyers, Cushman & Rea
ATTORNEYS

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

METHOD OF AND APPARATUS FOR MOLDING PLASTIC ARTICLES.

1,377,517.        Specification of Letters Patent.        Patented May 10, 1921.

Application filed October 23, 1919. Serial No. 332,626.

*To all whom it may concern:*

Be it known that I, EMIL E. NOVOTNY, a citizen of the United States, residing at Logan, in the county of Philadelphia and State of Pennsylvania, have invented new and useful Improvements in Methods of and Apparatus for Molding Plastic Articles, of which the following is a specification.

This invention relates to the art of molding, and has particular application to a novel and improved method of molding and curing articles composed in whole or in part of cementitious or plastic substances.

In the present instance I will describe my invention as employed in connection with the molding and curing of articles composed of a fiber body impregnated with a plastic such as a synthetic resin in the nature of a phenolic condensation product, but I wish it to be understood of course, that my method is not limited in its useful application to the treatment of bodies or articles composed of such a combination of materials, as it may be resorted to in any connection wherein its use may be deemed desirable.

It is well known in the molding art that certain plastics will harden and set to their final form under the application of pressure accompanied by either heating or cooling, or both.

For example, in making printing plates from such phenolic materials as bakelite or condensite, it is the practice to make a matrix by pressing a sheet of material, composed of fiber impregnated with phenolic material, against an original body of type while applying heat and pressure through the medium of a suitable heated press. In making the matrix, this heat and pressure should be maintained for about fifteen minutes. Then when it is desired to make the printing plate itself, a sheet of the phenolic material, or of fiber board impregnated with phenolic material, is placed on the matrix and heat and pressure applied through the medium of a suitable heated press to reproduce the printing characters in the face of the plate material. The heat and pressure should be maintained for at least fifteen minutes to properly harden and set the printing plate. Then, while still on the matrix, the plate should be cooled for about five minutes to prevent blistering and internal disturbances which are liable to occur in removing a hot plate from the matrix. Thus, in making a plastic printing plate, considerable time is consumed, about twenty-five minutes, and during this period the matrix, of course, is in use in making a single plate. Conequently, the output of plates in quantity is limited and this is a distinct disadvantage under conditions where it is desirable to produce a large number of identical plates in a relatively short space of time, for with a single matrix the plate-maker can only produce about eighteen plates in an eight hour day. Therefore, it is ordinarily necessary to make additional duplicate matrices which is expensive from the standpoint of time and labor particularly as additional expensive presses must be employed. Of course, the above recited disadvantages incident to the making of printing plates in quantities are also resident in the making of other solid, or flat or block-like articles from plastic materials which will harden and set in the manner of phenolic condensation products.

Furthermore, in the case of cylindrical, curved or hollow articles made from plastic materials, such as phenolic condensation products, so far as I am aware, it has heretofore been practically impossible to obtain satisfactory results in the molding operation. This is due to the fact that in the molding of such articles, it is necessary to employ a mold composed of a plurality of sections and consequently, it is difficult, if not impossible, to obtain uniform pressure throughout the entire area of the body being molded. As the strength of these molded plastic articles is dependent upon the high pressure exerted in the molding operation, and the uniformity of such pressure, it will be obvious that the failure to obtain a uniform high pressure will result in the production of weak places or spots in the complete article which will cause the breaking-down of the latter under constant use.

By the practice of my method I am enabled to produce molded plastic articles in great quantities in a relatively short space of time and at a comparatively low expense because, in making a printing plate for example, and also in making the matrix, I need not use the press for any extended length of time. In the manufacture of the matrix I may simply place the matrix sheet upon the body of type and subject it to heat and pressure for about one minute or just a sufficient length of time to form the type characters in the contacting face of the matrix. I then remove the matrix, without cooling, and subject it to my method hereinafter described. Likewise in making the plate against the matrix I subject the plate material to pressure for a short period of about one minute, or just for a sufficient time to mold the printing characters in the face of the plate material. Then, without cooling, I remove the plate from the matrix, and subject it to my method hereinafter described, this removal of the plate from the matrix making the latter immediately available for use in making another plate, so that both the matrix and the press will have an output of about fifteen times that obtainable under the old method hereinbefore mentioned, with the consequent increase in production and decrease in cost.

In the case of cylindrical, curved or hollow objects, by the use of my method, I am enabled to obtain a uniform and high pressure thereby avoiding weak spots in the finished articles and obviating the difficulties above mentioned as incident to the manufacture of such articles.

With the above recited objects, and others of a similar nature in view, my invention consists in the improved method and apparatus set forth in and falling within the scope of the appended claims.

In the accompanying drawings:

Figure 1 is a diagrammatic view, in section, of an apparatus embodying my invention, certain of the parts being merely conventionally illustrated.

Fig. 2 is a view partly in vertical section and partly in elevation, and showing a modified form of apparatus wherein I dispense with the use of a reservoir and pump for the molten metal.

Briefly I will state that after the article to be made has been given its shape and form, as for example, by forming the matrix against the type body, or forming the plate against the matrix, or winding a tube about a mandrel, or shaping a box, I take the article thus formed and place it in a container into which I then admit a fluid body which will not adhere to, penetrate or combine with the material of the article being molded. For such fluid I prefer to use molten metal or metallic alloys. This molten metal may be lead, or an alloy of tin and lead, or an alloy composed of bismuth, lead, tin and cadmium, or any alloy having a low melting temperature, say from 100° F. to 250° F. I might use mercury but prefer to use an alloy containing lead. I preferably use a pump for introducing the molten metal to the container in which the article is located, the metal being first introduced at a low temperature and under low pressure both of which are gradually raised until a high pressure and high temperature are obtained. The pressure exerted by the molten metal upon all sides of the article will be uniform and will result in the hardening, setting and compacting of the material of the article so that an exceedingly high class and satisfactory product results. After the article or articles in the container have been subjected to this fluid pressure for about fifteen minutes, they are cooled as hereinafter described by reducing the temperature within the container to a point sufficient to cool the article or articles, but not low enough to solidify the fluid metal which still maintains pressure. After the article or articles have been cooled and hardened and set to their final form, the molten metal is drained off from the tank and the articles are removed and are ready for use.

I will now proceed to describe an apparatus which may be used in the practice of my method.

Referring now to the accompanying drawings in detail, the letter A indicates a receiving tank wherein the articles X are subjected to pressure, B designates a molten metal reservoir and C is a suitable pump by means of which the molten metal Y may be forced under pressure from the reservoir to the tank.

The body of the tank A is shown at 1, and the walls thereof are hollow to provide a chamber which may be heated by steam and cooled by water, such chamber being shown at 2. The cover of the tank is shown at 3 and is adapted to fit tightly on top of the tank and to be locked or fastened thereon as by means of suitable bolts 4, suitable asbestos gaskets 5 being interposed between the cover and the tank top. The tank and the cover are preferably made of cast iron and provided with an asbestos jacket as at 6. Steam is admitted from a suitable source into the chamber of the tank through the pipe 7 which may also be used to admit water when the steam is shut off and it is desired to cool the articles. Any suitable arrangement of piping and valves may be used for this purpose. A basket or other container, preferably formed of a wire mesh and in which the articles are held suspended against movement is intended to be placed in the tank. Such basket is shown at D and may be of a size to contain any desired number of articles.

This tank A is provided with a steam trap 8 for the outlet of the condensation steam products, and an outlet pipe 9 for a direct outlet for water and a suitable valve 9' being provided for the water outlet. The tank is also provided with a thermometer 10 and a pressure gage 11 of any well known form.

The reservoir B also embodies a body portion 12 having hollow walls providing a steam and water jacket 13, the cover 14 of the reservoir and the body 12 thereof being faced with asbestos for retaining the heat as shown at 15. The reservoir B is connected with the conventionally illustrated pump C by a jacketed pipe 16, so that such pipe may be heated by steam and cooled by water. Molten metal from the reservoir is drawn by the pump through this pipe 16 and forced through the jacketed pipe 17 into the tank A, the pipe 17 being provided with a check valve 18 and a stop valve 19 which are both open when the pump is forcing the molten metal into the tank A. When the pump is thus supplying metal to the tank A steam is admitted to the latter through the pipe 7 from a suitable source and maintains a high temperature on the tank. The steam is used for heating both the tank A and the reservoir B, for after passing from the pipe 7 into the chamber of the tank A and circulating therethrough it passes out through the jacket of the pipe 17, through the jacket c of the pump C, thence through the jacket of the pipe 16 into the jacket or chamber 13 of the reservoir and after circulating therethrough escapes through a steam waste pipe 20. The jacket of the pump is also provided with a steam condensation outlet 21. The metal is pumped into the closed tank A until the latter is filled therewith and until the pressure gage shows the desired pressure and the thermometer indicates that the proper degree of heat is on the tank.

The stop valve 19 may then be closed and the pump shut down and the heat and pressure maintained on the articles for about fifteen minutes, or until they are properly "cooked" or hardened and set. The steam may then be shut off by closing the steam valve 7' in the pipe 7, and water from a suitable source of supply may pass through the valved branch pipe 7'' into the head of the pipe 7, the valve 7ª of the pipe 7'' being open for this purpose. The water circulating through the chamber of the tank A passes through the jacket of the pipe 17, through the jacket of the pump and through the jacket of the pipe 16 to the jacket of the reservoir B, escaping through the outlet 20. At the same time, the valve 9' of the outlet pipe 9 of the tank A having been opened, a part of the water will escape therethrough, and some of the water will escape through the steam trap 8, and some through the outlet 21 of the pump C.

When the articles have been thoroughly cooled, the stop valve 19 is opened as is also the stop valve 22 in the jacketed by-pass pipe 23, and the molten metal which has not been cooled down by the water to a point where it will solidify will flow past the valve 19 and past the open valve 22 through the by-pass 23 back into the reservoir where it may be reheated. Of course, at this time the pump check valve 18 will prevent the molten metal flowing through the pump. When the pump is operated to force the molten metal from the reservoir B to the tank A the valve 22 in the by-pass is closed and the valve 19 is opened. The reservoir B is also provided with a suitable pressure gage 24 and any preferred form of thermometer 25. After the molten metal has been drained from the tank A, the basket with the now finished articles may be removed, other articles placed in the basket and the operation repeated.

In the case of cylindrical articles, as in the molding of a tube, the material may be wound about a mandrel and then suspended in the basket while held against endwise movement and subjected to the pressure of the molten metal which will result in the uniform application of the pressure throughout the entire area of the article. This will obviate the use of sectional molds and consequently avoid the weak spots which result in the article from the reduced pressure, especially at the points where the sections of the molds meet.

In Fig. 2, I have shown a slightly modified form of apparatus, for in this case, I dispense with the use of a reservoir for the molten metal, and I also avoid the necessity of pumping such molten metal. In said figure, the jacketed tank A' is nearly filled with the metal which is kept in a molten state by steam circulating through the jacket of the tank. The basket containing the articles is lowered into this bath of metal which is shown at F, and after the cover has been applied, a fluid Z such as oil may be supplied under pressure through the pipe 26 to completely fill the space between the top of the bath of metal and the wall of the cover, the oil being preferably introduced by means of a hydraulic pump. The pressure is thus conveyed to the body of molten metal and the latter in turn exercises pressure upon the articles immersed therein. When it is desired to remove the article, the oil is drained off through the pipe 27, the pressure thus released and the basket may be lifted from the bath.

While I have herein referred to the use of steam as the heating medium for the molten metal, it will, of course, be understood that other means may be employed for maintaining the molten bath. For example, I might use a hot gas or the tank might be heated by means of a suitable furnace or through electrical resistance.

While I have herein shown and described certain preferred embodiments of my invention, I wish it to be understood that I do not confine myself to all the details herein set forth by way of illustration, as modification and variation may be made without departing from the spirit of the invention, or exceeding the scope of the appended claims.

What I claim is:—

1. The herein described method of molding and curing a plastic article which consists in placing said article in a container and subjecting the same to pressure exerted by a heated fluid-like body, and subsequently cooling said article in the fluid-like body while maintaining the latter in its fluid state.

2. The herein described method of molding and curing a plastic article which consists in placing said article in a container and subjecting the same to pressure exerted by heated molten metal, the heat and pressure of said molten metal being gradually increased as the treatment of the article progresses, whereby said article is gradually hardened and set.

3. The herein described method of molding and curing plastic articles which comprises immersing the article in a body of molten metal in a container and applying pressure by the introduction of a different fluid into the container.

4. An apparatus for molding and curing plastic articles comprising a container, means for supporting the articles within the container, a reservoir for containing molten metal, a pump for forcing the molten metal from the reservoir to the container, means for heating the container and the metal therein, and means for cooling the container without solidifying the metal.

In testimony whereof I have hereunto set my hand.

EMIL E. NOVOTNY.